United States Patent
Ben-Youcef et al.

(10) Patent No.: US 8,951,694 B2
(45) Date of Patent: Feb. 10, 2015

(54) METHOD FOR PREPARING AN ENHANCED PROTON EXCHANGE MEMBRANE AND ENHANCED PROTON EXCHANGE MEMBRANE

(75) Inventors: Hicham Ben-Youcef, Brugg (CH); Lorenz Gubler, Brugg (CH); Dirk Henkensmeier, Seoul (KR)

(73) Assignee: Paul Scherrer Institut, Villigen (CH)

( * ) Notice: Subject to any disclaimer, the term of this patent is extended or adjusted under 35 U.S.C. 154(b) by 255 days.

(21) Appl. No.: 13/147,060

(22) PCT Filed: Feb. 1, 2010

(86) PCT No.: PCT/EP2010/051176
§ 371 (c)(1),
(2), (4) Date: Jul. 29, 2011

(87) PCT Pub. No.: WO2010/089274
PCT Pub. Date: Aug. 12, 2010

(65) Prior Publication Data
US 2011/0294035 A1    Dec. 1, 2011

(30) Foreign Application Priority Data
Feb. 5, 2009  (EP) .................................... 09100098

(51) Int. Cl.
*H01M 8/10* (2006.01)
*C08J 5/22* (2006.01)
*H01M 8/02* (2006.01)

(52) U.S. Cl.
CPC ............ *C08J 5/2243* (2013.01); *H01M 8/0289* (2013.01); *H01M 8/1023* (2013.01);
(Continued)

(58) Field of Classification Search
CPC .. C08J 2325/08; C08J 2333/20; C08J 5/2243; H01M 8/0289; H01M 8/1023; H01M 8/1039; H01M 8/1088; Y02E 60/521
USPC .......................... 429/482, 483, 491–494, 535
See application file for complete search history.

(56) References Cited

U.S. PATENT DOCUMENTS

2002/0127450 A1*  9/2002  Xie ................................. 429/30
2008/0199754 A1*  8/2008  Scherer et al. ................... 429/33

OTHER PUBLICATIONS

Gubler, et al., "Advanced monomer combinations for radiation grafted fuel cell membranes", Electrochemistry Communications 8, 2006, pp. 1215-1219.

(Continued)

*Primary Examiner* — Patrick Ryan
*Assistant Examiner* — Ben Lewis
(74) *Attorney, Agent, or Firm* — Laurence A. Greenberg; Werner H. Stemer; Ralph E. Locher

(57) ABSTRACT

A novel approach based on the increase of the intrinsic oxidative stability of uncrosslinked membranes is addressed. The co-grafting of styrene with methacrylonitrile (MAN), which possesses a protected α-position and strong dipolar pendant nitrile group, onto 25 μm ETFE base film is disclosed. Styrene/MAN co-grafted membranes were compared to styrene based membrane in durability tests in single $H_2/O_2$ fuel cells. The incorporation of MAN improves the chemical stability dramatically. The membrane preparation based on the copolymerization of styrene and MAN shows encouraging results and offers the opportunity of tuning the MAN and crosslinker content to enhance the oxidative stability of the resulting fuel cell membranes.

12 Claims, 4 Drawing Sheets

(52) U.S. Cl.
CPC .......... *H01M8/1039* (2013.01); *H01M 8/1088* (2013.01); *H01M 8/1044* (2013.01); *Y02E 60/521* (2013.01); *C08J 2325/08* (2013.01); *C08J 2333/20* (2013.01)
USPC .......... 429/493; 429/482; 429/483; 429/491; 429/492; 429/494; 429/535

(56) References Cited

OTHER PUBLICATIONS

Qiu, et al., "Pre-irradiation grafting of styrene and maleic anhydride onto PVDF membrane and subsequent sulfonation for application in vanadium redox batteries", Journal of Power Sources 177, 2008, pp. 617-623.

Kim, et al., "Thermal, mechanical and electrical properties on the styrene-grafted and subsequently sulfonated FEP film induced by electron beam", Polymer Degradation and Stability 93, 2008, pp. 1214-1221.

Kaur, et al., "A study on graft copolymerization of electron donor and electron acceptor monomer mixture on to Tefzel film", Radiation Physics and Chemistry 72, 2005, pp. 489-495.

Kaur, et al., "Modification of Tefzel film through graft copolymerization", Polymer International 53, Society of Chemical Industry, 2004, pp. 1572-1580.

Kaur, et al., "Modification of Tefzel film by Graft Copolymerization of Acrylonitirle and Methacrylonitrile for use as Membrane", Desaliation 119, 1998, pp. 359-360.

Ghada, "Preparation and Properties of Ion-Exchange Membranes Prepared by the Radiation-Induced Grafting of a Styrene/Acrylic Acid Comonomer onto Low-Density Polyethylene", Journal of Applied Polymer Science, 2007, pp. 2769-2777, vol. 104, published online in Wiley InterScience (www.interscience.wiley.com).

* cited by examiner

METHOD FOR PREPARING AN ENHANCED PROTON EXCHANGE MEMBRANE AND ENHANCED PROTON EXCHANGE MEMBRANE

BACKGROUND OF THE INVENTION

Field of the Invention

The present invention relates to a method for preparing a proton exchange membrane. The present invention further relates to the membrane itself.

The stability and reliability of the proton exchange membrane in fuel cells is one of the crucial issues to bring this technology from the prototype to the commercial level. Likewise, the development of cost effective proton exchange membranes to replace the state-of-the-art and expensive perfluorinated membranes (e.g., Nafion®) is another main challenge. The radiation induced grafting technique in combination with low cost materials, either fluorinated or partially fluorinated base polymers, offers several advantages. The radiation induced grafting is a very versatile technique which allows the functionalization of the base material and the introduction of the desired property (proton conductivity). The attractiveness of this technique is based on the possibility to easily tune and control several parameters in a wide range to reach the desired properties.

The Paul Scherrer Institut is devoted to the development of low-cost polymer electrolyte membranes, and extensive work to improve the mechanical and chemical stability is carried out. Lifetimes exceeding 4000 h at a temperature of 80° C. and steady state conditions were achieved with radiation-grafted crosslinked membranes based on styrene/divinylbenzene (DVB: crosslinker) grafted onto poly(tetrafluoroethylene-co-hexafluoropropylene) (FEP). The crosslinking and graft level (GL) were pointed out to be the key parameters which can be tuned to find a balance between the conductivity and stability in radiation grafted membranes. Therefore, FEP based membranes were optimized with respect to their performance and durability.

In order to increase the intrinsic properties of the base polymer, the partially fluorinated poly(ethylene-alt-tetrafluoroethylene) (ETFE) has been chosen, where several advantages in comparison with the FEP base film were demonstrated. Hence, a detailed study on the influence of grafting parameters and reaction kinetics was performed for the grafting of styrene onto ETFE. Moreover, the influence of crosslinker concentration was investigated and correlations between the content of DVB and the ex situ and in situ relevant properties for fuel cells were established. A durability test was performed with the optimized ETFE-based membrane (5% DVB) and the test was operated over 2180 h without significant degradation within the active area.

It is well known that the styrene-sulfonic acid group in the grafted membrane suffers from the weakness of the α-hydrogen position, which is prone to radical attack under fuel cell conditions. A lot of work is devoted to improve the stability of radiation grafted membranes by the use of new monomer combinations with low cost impact. Several authors reported on styrene/acrylonitrile, α-methylstyrene/styrene and p-methylstyrene/tert-butyl styrene. So far, no fuel cell experiments were shown and only ex situ chemical stability in $H_2O_2$ was reported. However, the real stress occurring during fuel cell operating conditions is complex (hydration/dehydration, mechanical stress, aggressive species (HO., HOO.)) and single cell tests are needed to evaluate the membranes. Recently, alternative monomers were reported and tested and more data is available for α,β,β-trifluorostyrene derivatives and α-methylstyrene/methacrylonitrile, which show better stability but suffer from a slow grafting kinetics.

BRIEF SUMMARY OF THE INVENTION

It is therefore the aim of the present invention to provide a method for preparing a proton exchange membrane having a long-term stability under fuel cell operation conditions.

These objectives are achieved according to the present invention by a method for preparing a membrane to be assembled in a membrane electrode assembly, such as a polymer electrolyte membrane fuel cell, comprising the steps of:
  a) irradiating a base polymer film with electromagnetic and/or particle radiation in order to form reactive centers, i.e. radicals, within said base polymer film;
  b) exposing the irradiated base polymer film to a mixture of monomers amenable to radiation induced graft polymerization comprising styrene and methacrylonitrile in order to achieve the formation of a graft copolymer in said irradiated base polymer film; and
  c) sulfonating the grafted base polymer film to introduce sulfonic acid sites providing ionic conductivity of the material.

With respect to the membrane electrode assembly these objects are achieved according to the present invention by a membrane electrode assembly, comprising a polymer electrolyte layer which is sandwiched between a cathode layer and an anode layer, whereby said polymer electrolyte layer is a graft copolymer membrane which comprise styrene and methacrylonitrile as co-monomer.

In a preferred embodiment of the present invention the molar ratio of styrene/methacrylonitrile may be in the range of 10/90 to 90/10, preferably in the range of 50/50 or, especially 1/2. The monomer mixture may comprise additional monomers to obtain specific added membrane functionality, e.g. crosslinking using crosslinker, such as DVB, DIPB and BVPE. The neat monomer mixture may be used for the grafting reaction, or a solvent or solvent mixture, such as isopropanol and water, may be added to the monomer mixture.

In a further preferred embodiment, the mixture may comprise 5 to 20 vol % styrene and 5 to 20 vol % methacrylonitrile. A preferred example for the mixture may comprise 10 to 40 vol % monomers, 50 to 90 vol % isopropanol and 5 to 20 vol % water.

In order to achieve an advantageous grafting reaction, the grafting step (step (b) above) has to be carried out under a nitrogen atmosphere over a period of at least 1 hour, preferably 5 to 10 hours.

In summarizing the invention it was found that for the radiation induced graft copolymerization, a mixture of styrene and methacrylonitrile (MAN) onto base polymer films such as FEP and ETFE offers distinct advantages over other co-polymer mixtures, such as α-methylstyrene (AMS) and methacrylonitrile (MAN). Following experimental observations were made:
  The nitrile groups of MAN do not hydrolyze in the graft copolymer with styrene during the sulfonation process.
  Using MAN as co-monomer yields a fuel cell membrane with inherently superior durability over styrene based membranes.
  The grafting kinetic of the styrene:MAN is faster than that of AMS:MAN.
  Using MAN as co-polymer in the grafting of styrene, practical graft levels can be obtained.
  The content of MAN can be tuned easily to obtain desirable properties at optimized graft levels.

The MAN units in the styrene/MAN membranes do not adversely affect subsequent process steps (e.g. sulfonation) or the mechanical properties of the membrane.

The MAN units do not interfere adversely with the proton conductivity provided by the sulfonated styrene units.

The polar MAN units have a positive effect on the water management properties of the membrane.

The methyl group in the MAN reduces the back-biting abstraction of the hydrogen in the styrene/MAN system.

The polar MAN units have a positive effect on interfacial properties of the membrane electrodes assembly (MEA).

The use of MAN induces a decrease of water content leading to an increase of the dimensional stability.

Preferred examples of the present invention are hereinafter described with reference to the following drawings. Thereby it is depicted in:

DESCRIPTION OF THE INVENTION

Figure 1:
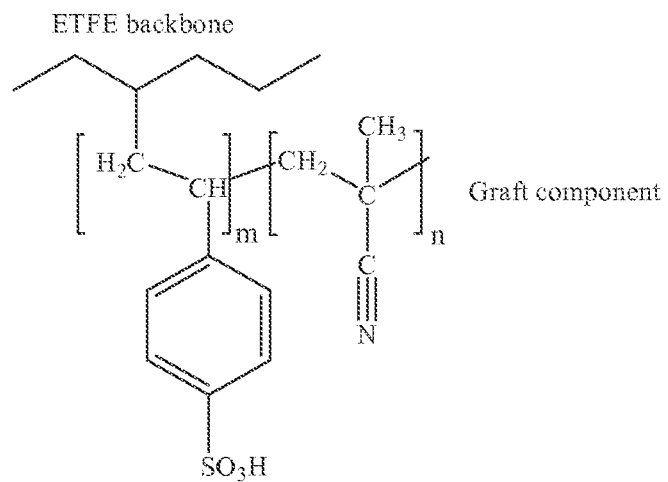
FIG. 1 a schematic overview over the tentative structure of styrene and MAN co-grafted into ETFE.

The novel approach for the preparation of radiation grafted membranes with increased stability via co-grafting of styrene and MAN is presented hereinafter. Selected membranes prepared at the same conditions were characterized for their ex situ relevant fuel cell properties (IEC, water uptake, conductivity), and the fuel cell performance and durability of the MEAs were evaluated and compared against those of styrene based membranes. As far as we are aware, this is the first combination of these two monomers in proton exchange membranes for fuel cell application. The tentative structure of styrene and MAN co-grafted into ETFE base polymer film is shown in FIG. 1.

ETFE (Tefzel® 100LZ) films of 25 μm thickness, purchased from DuPont (Circleville, USA), were used as base polymer. ETFE films were washed in ethanol and dried in vacuum at 60° C. The films were electron beam irradiated with a dose of 1.5 kGy at Leoni Studer AG, Daniken, Switzerland. Subsequently, the films were stored at −80° C. until used. Grafting reactions were carried out in a glass reactor under a nitrogen atmosphere. The grafting solution consisted of 20% (v/v) monomer (mixture of styrene/MAN: 1/1 (mol/mol)), 70% (v/v) isopropanol and 10% (v/v) water. The grafting reaction and the sulfonation reactions were performed as described in the state of the art, for example in the European Patent application EP 05 002 875.2. The graft level (GL) of each film was determined from the weight of irradiated film ($W_i$) and grafted film ($W_g$):

$$GL\ (\%) = \frac{W_g - W_i}{W_i} \times 100\%$$

The composition of the grafted films was determined via FTIR spectroscopy using a Perkin Elmer FTIR System 2000 spectrometer. The peak-fitting was performed using GRAMS/386 software (version 3.02) from Galactic Industries.

The ex situ membrane properties, ion exchange capacity (IEC), proton conductivity, water uptake and hydration number in fully swollen state at room temperature were determined using in-house developed procedures.

The ETFE-based membranes were hotpressed (110° C./15 kN/180 s) together with ELAT® electrodes (type LT140EWSI, E-TEK/BASF Fuel Cell, Inc.) with a platinum loading of 0.5 mg Pt cm$^{-2}$. The electrochemical characterization (polarization curves, impedance, $H_2$ permeation) and the entire description of the used procedure are state-of-the-art. After completion of the test and disassembling the membrane from the MEA, it was exchanged into salt form ($K^+$) and then dried over night at 60 C. A post mortem analysis by FTIR was performed in the active area of the tested membrane by the use of a metallic slit mask (rectangular aperture 0.5 cm×1.9 cm).

Figure 2:
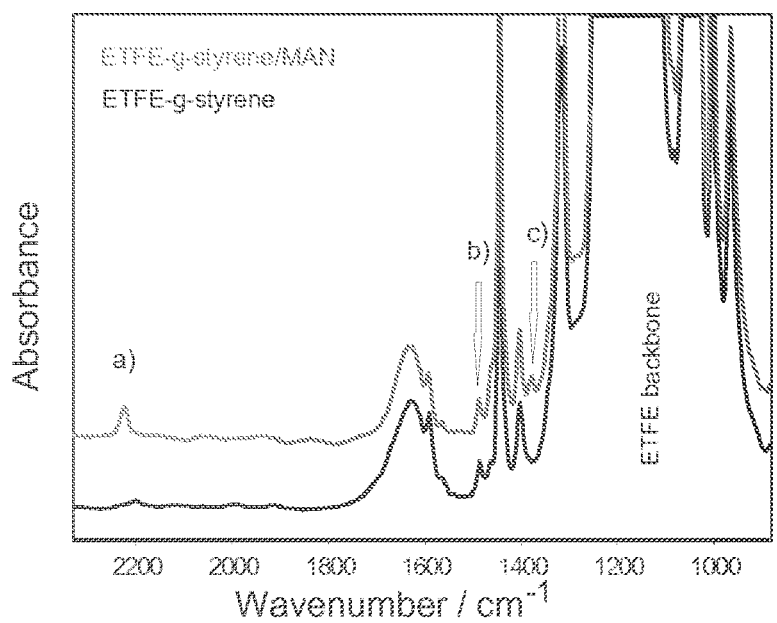
FIG. 2 an FTIR spectrum of sulfonated styrene/MAN co-grafted and pure styrene grafted membranes based on ETFE.

Styrene/MAN grafting into ETFE films was carried out at 6 and 8 h reaction time under known conditions (H. Ben youcef, A. Gürsel, A. Wokaun, G. G. Scherer, J. Membr. Sci. 311 (2008) 208). In order to determine the molar ratio of MAN versus styrene in the membranes, the peaks appearing at 1494 cm$^{-1}$ (C═C) and at 2234 cm$^{-1}$ (C≡N) were exploited to determine the extent of the styrene and MAN moieties, respectively, as shown in FIG. 2. The FTIR spectra show clearly that the nitrile group is not affected by the sulfonation step during the membrane preparation.

Selected membranes were characterized for their ex situ fuel cell relevant properties (GL, composition, IEC, water uptake and conductivity) (see Table 1). The graft level of the styrene/MAN membranes is higher (~26 and 27%) compared to the styrene (~21%) based membrane, while the IEC values are slightly different, mainly due to the MAN content, which is not contributing to the IEC. The conductivity values of the styrene/MAN based membranes were higher compared to purely styrene grafted membrane. It is assumed that the hydrophilicity of the nitrile group and its ability to form hydrogen bonds with water plays a significant role.

Comparing ex situ properties of both styrene/MAN membranes, the lower water uptake, hydration number and conductivity values in the sample #1 are attributed to the lower styrene content (less sulfonic acid groups). Interestingly, the water uptake and hydration number are more affected than the conductivity.

Figure 3:
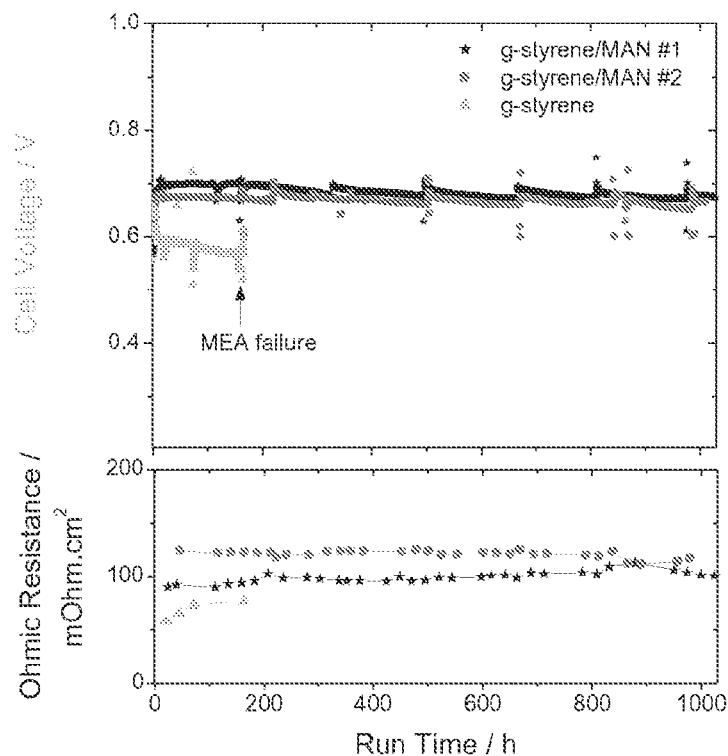
FIG. 3 a history plot of the MEA's based on ETFE-g-styrene/MAN membranes compared with purely styrene based ETFE membrane.

Ex situ characterized styrene/MAN based membranes #1 and #2 and the styrene membrane were assembled into the fuel cell, and the MEAs were operated at a constant current density of 500 mA·cm$^{-2}$ (see FIG. 3). Current pulse, $H_2$ permeation and electrochemical impedance measurements were performed intermittently over the testing period to characterize the cell in situ, as described in Table 2. The first observation is that the Nafion®112 based MEA exhibits a lower ohmic and polarization resistance in comparison to the MEAs with grafted ETFE membranes, while the $H_2$ permeation is higher. The poorer interfacial compatibility (high polarization resistance) in the case of the ETFE-based membranes is mainly due to the lower compatibility of these grafted membranes to the Nafion® ionomer used in the catalyst layer.

Figure 4:
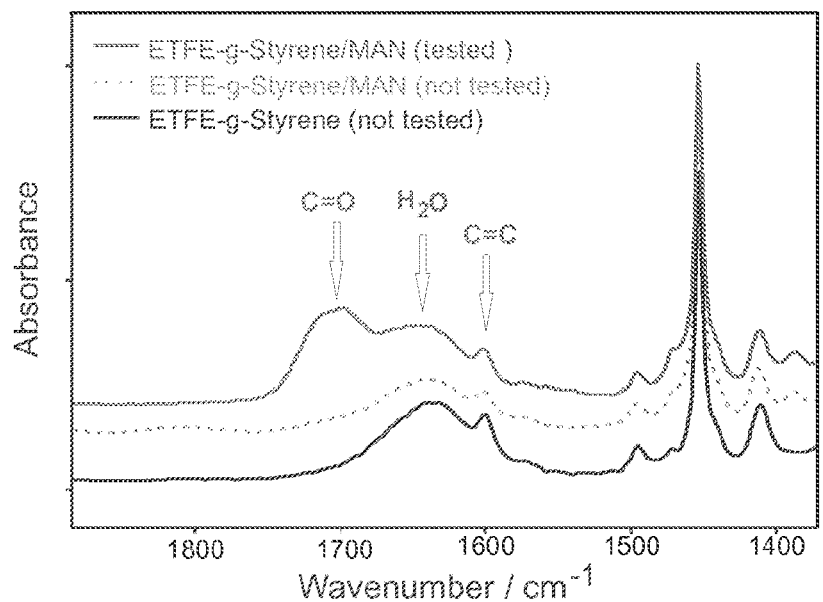
FIG. 4 FTIR spectra of pristine membranes and tested styrene/MAN co-grafted membranes.

Surprisingly, the post mortem analysis of the tested cell reveals the existence of a new broad peak appearing at ~1700 cm$^{-1}$, assigned to C=O vibration (see FIG. 4). The observed C=O group is considered to be the consequence of nitrile group hydrolysis under fuel cell operating conditions. The sulfonation reactions did not affect the nitrile group and no hydrolysis of this group was observed in the as-prepared membrane. The fitting of the nitrile and α-methyl peaks of the MAN were used to determine the extent of hydrolysis in the tested membranes, which was estimated to be 13%, and mostly located near the O$_2$ inlet.

Figure 5:
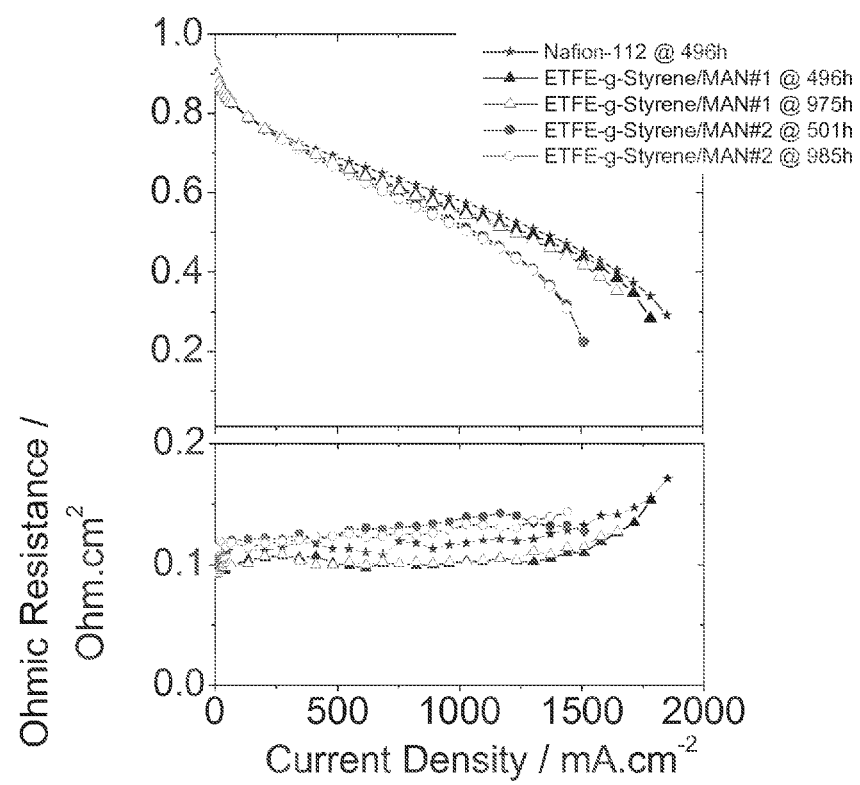
FIG. 5 single cell polarization curves using ETFE-g-styrene/MAN membranes with two different MAN contents (sample #1 and #2 in Table 3)

The single cell test of the pure styrene grafted membrane was stopped after 160 h due to high gas crossover (>10 ml·min$^{-1}$) and pinhole formation in the active area of the tested membrane. In FIG. 5, again for comparison purpose, the uncrosslinked styrene grafted membranes (ETFE-g-styrene) without DVB crosslinker and Nafion®112 are presented. This type of grafted membrane is very unstable in the fuel cell and leads to said rapid failure of the membrane electrode assembly (pinhole formation in the active area of the MEA) (cf. Table 4, too). Membranes ETFE-g-styrene-co-MAN #1 and #2 are of the claimed type, using styrene and MAN as co-monomers, with fixed graft level (27%) were operated for more than 1000 h without any failure (see FIG. 5). FIG. 5 shows single cell polarization curves using the claimed type (ETFE-g-styrene/MAN) membranes with two different MAN contents (sample #1 and #2 in Table 3) compared with Nafion®112 membrane @ different periods. Cell temperature 80° C.; fuel: H$_2$, oxidant: O$_2$, both gases humidified at 80° C., pressure 1 bar.

Membranes grafted with styrene show inferior stability and life time in the single cell as compared to membranes of the claimed type which can be taken also from FIG. 5. The single cell polarization curve in FIG. 5 shows that both styrene/MAN grafted membranes show no significant changes in performance after 1000 h of operation time under fuel cell conditions, whereas the styrene grafted membrane showed a decrease of the performances after 160 h. The styrene/MAN membrane with lower MAN content yields a lower ohmic cell resistance and higher performance at medium and high current densities.

Figure 6:
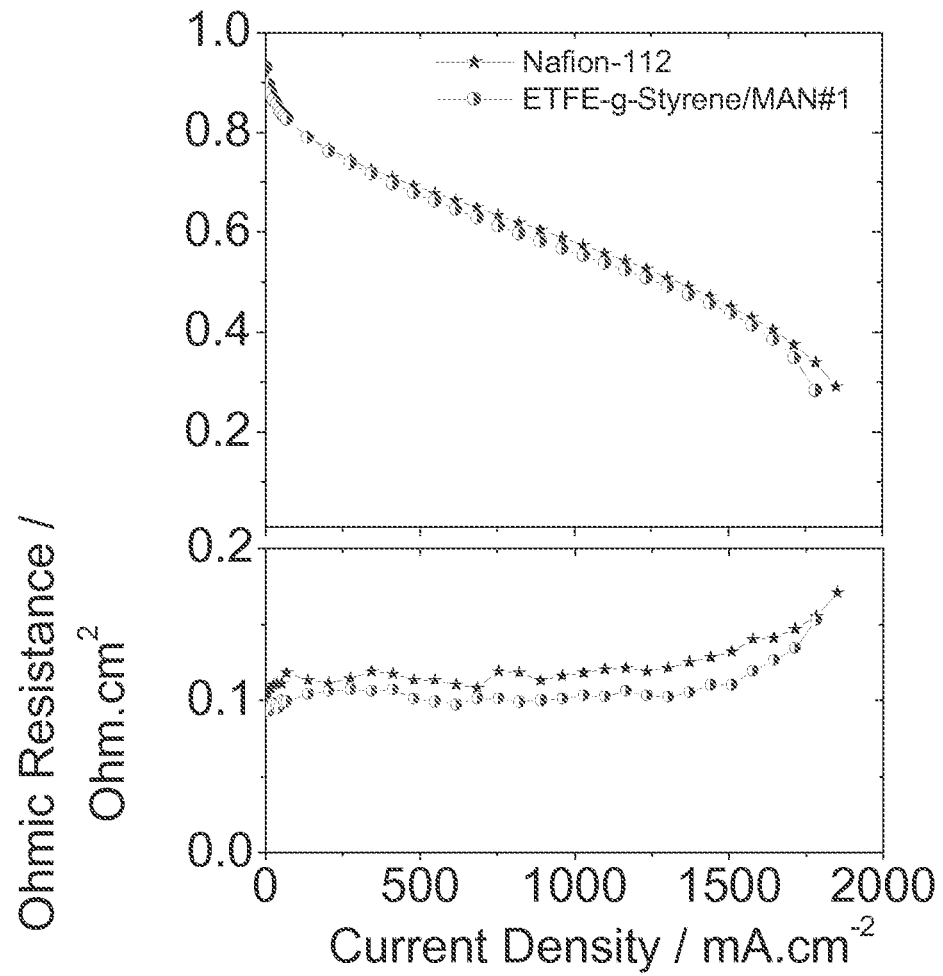
FIG. 6 single cell polarization curves using ETFE-g-styrene/MAN membrane compared with Nafion® 112 membrane.

Compared to the state-of-the-art Nafion®112 membrane, the styrene/MAN grafted membrane shows similar single cell performance and slightly lower ohmic resistance which is depicted in FIG. 6. FIG. 6 shows the single cell polarization curves using the claimed type (ETFE-g-styrene/MAN) membrane compared with Nafion®112 membrane after 496 h operation time. Cell temperature 80° C.; fuel: H$_2$, oxidant: O$_2$, both gases humidified at 80° C., pressure 1 bar.

TABLE 1

Ex situ properties of ETFE based styrene/MAN co-grafted and pure styrene grafted membranes, compared against Nafion ®112. (GL = graft level)

| Membrane | GL [%] | Molar ratio [MAN/styrene] | IEC [mmol · g$^{-1}$] | Conductivity* [mS · cm$^{-1}$] | Water uptake* [% wt] | Hydration number [n(H$_2$O)/n(SO$_3$H)] |
|---|---|---|---|---|---|---|
| g-styrene/MAN #1 | 25.7 | 0.34 +/− 0.02 | 1.35 +/− 0.07 | 57 +/− 2 | 18.6 +/− 4.4 | 7.6 +/− 1.0 |
| g-styrene/MAN #2 | 27.4 | 0.26 +/− 0.04 | 1.44 +/− 0.04 | 69 +/− 3 | 26.8 +/− 1.5 | 10.6 +/− 0.8 |
| g-styrene | 20.8 | — | 1.46 +/− 0.06 | 49 +/− 2 | 25.6 +/− 3.1 | 9.7 +/− 0.7 |
| Nafion ®112 | — | — | 0.91 | 82 +/− 6 | 33.5 +/− 1.8 | 18.0 +/− 0.9 |

*Measurements were performed in fully swollen state at room temperature.

TABLE 2

MEA performance characteristics from fuel cell test data of styrene/MAN co-grafted, and pure styrene grafted membranes and Nafion ®112 after 165 h of operating time using ac impedance measurements and H$_2$ permeation.

| Membrane | Time on test [h] | R$_\Omega$ [Ohm · cm$^2$] | R$_{pol}$ [Ohm · cm$^2$] | H$_2$ permeation [mA · cm$^{-2}$] | MEA failure mode |
|---|---|---|---|---|---|
| g-styrene-co-MAN #1 | 1032 | 108 | 153 | 0.31 | No failure |
| g-styrene-co-MAN #2 | 1009 | 132 | 188 | 0.35 | No failure |
| g-styrene | <160 | — | — | — | Crossover leak > 10 ml · min$^{-1}$ |
| Nafion ®112 | 600 | 86 | 138 | 0.90 | No failure |

TABLE 3

Measured value of IEC, water uptake, hydration number and conductivity of the ETFE-based membranes compared with the values of FEP-g-styrene and Nafion ®112.

| Membrane | Graft Level [%] | Molar ratio [MAN/styrene] | IEC [mmol · g$^{-1}$] | Conductivity* [mS · cm$^{-1}$] | Water uptake* [% wt] |
|---|---|---|---|---|---|
| g-styrene-co-MAN #1 | 27.4 | 0.26 +/− 0.04 | 1.3 +/− 0.1 | 69 +/− 3 | 26.8 +/− 1.5 |
| g-styrene-co-MAN #2 | 27.1 | 0.41 +/− 0.02 | 1.1 +/− 0.0 | 42 +/− 1 | 25.5 +/− 0.4 |
| g-styrene | 20.8 | n/a | 1.4 +/− 0.1 | 49 +/− 2 | 25.6 +/− 3.1 |
| Nafion ®112 | n/a | n/a | 0.9 +/− 0.1 | 82 +/− 6 | 33.5 +/− 1.8 |

*Measurements were performed in fully swollen state at room temperature.

TABLE 4

Duration of the fuel cell tests performed uETFE-g-styrene-sing co-MAN, ETFE-g-styrene, FEP-g-styrene and Nafion ®112.

| Membrane | Time on test [h] | MEA failure mode |
| --- | --- | --- |
| g-styrene-co-MAN #1 | 1032 | No failure |
| g-styrene- co-MAN #2 | 1009 | No failure |
| g-styrene | <165 | Crossover leak > 10 ml · min$^{-1}$ |
| Nafion ®112 | 600 | No failure |

The invention claimed is:

1. A method of preparing a membrane to be assembled in a membrane electrode assembly, the method which comprises:
    a) irradiating a base polymer film with radiation selected from the group consisting of electromagnetic radiation and particle radiation in order to form reactive centers (i.e. radicals) within the base polymer film;
    b) exposing the irradiated base polymer film to a mixture of monomers amenable to radiation-induced graft polymerization comprising styrene and methacrylonitrile to induce a formation of a graft copolymer in the irradiated base polymer film and to form a grafted base polymer film; and
    c) sulfonating the grafted base polymer film to introduce sulfonic acid sites providing ionic conductivity of the material.

2. The method according to claim 1, which comprises assembling the membrane in a polymer electrolyte membrane fuel cell.

3. The method according to claim 1, which comprises setting a ratio of styrene to methacrylonitrile within a range from 10:90 to 90:10.

4. The method according to claim 3, which comprises setting the ratio to substantially 50:50.

5. The method according to claim 3, which comprises setting the ratio to substantially 1/2.

6. The method according to claim 1, wherein the mixture comprises 5 to 20 vol % styrene and 5 to 20 vol % methacrylonitrile.

7. The method according to claim 6, wherein the mixture contains further monomers, or a solvent, or a solvent mixture.

8. The method according to claim 7, wherein the further monomers include a crosslinker.

9. The method according to claim 8, wherein the crosslinker is selected from the group consisting of DVB, DIPB, and BVPE.

10. The method according to claim 6, wherein the mixture contains isopropanol and water.

11. The method according to claim 6, wherein the mixture comprises 10 to 40 vol % monomers, 50 to 90 vol % isopropanol, and 5 to 20 vol % water.

12. The method according to claim 1, wherein step b) is carried out under an inert atmosphere over a period of at least one hour.

* * * * *